Sept. 4, 1934.    A. F. HANNEY    1,972,559

UNIVERSAL JOINT

Filed Nov. 3, 1932

INVENTOR

Angus F. Hanney

BY

Brockett, Hyde, Higley & Meyer

ATTORNEYS

Patented Sept. 4, 1934

1,972,559

UNITED STATES PATENT OFFICE 1,972,559

UNIVERSAL JOINT

Angus F. Hanney, Norwood, Ohio, assignor to The American Laundry Machinery Company, Cincinnati, Ohio, a corporation of Ohio Application November 3, 1932, Serial No. 641,111

7 Claims. (Cl. 64—103)

This invention relates to universal joints, and its object is to provide such a joint of extreme simplicity and correspondingly low cost, by which the pair of shafts to be joined need not lie in a common plane.

Other objects of the invention are to provide the simplest of connections between the joint and the shafts joined, and to provide novel means for lubrication of the moving parts at the joint.

Figure 1:
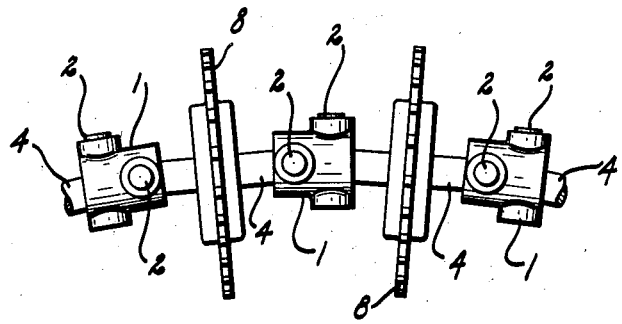
Figure 2:
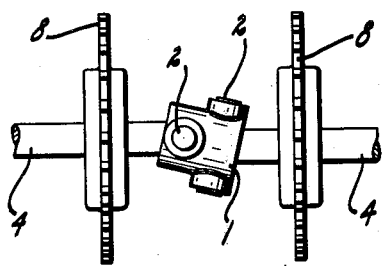
Figure 3:
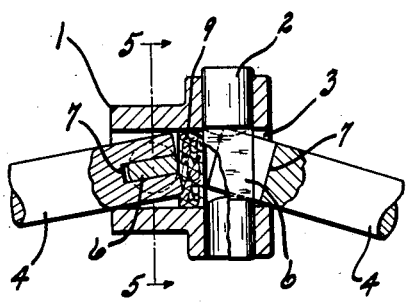
Figure 4:
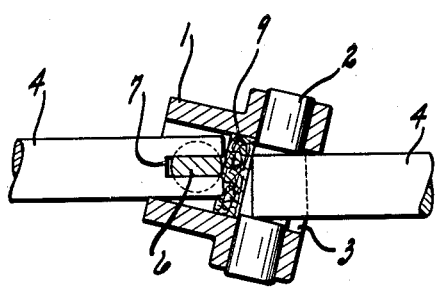
Figure 5:
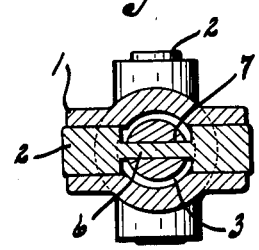

The exact nature of this invention, together with further objects and advantages thereof, will be apparent from the following description taken in connection with the accompanying drawing, in which Fig. 1 is an assembly view showing an installation in which an embodiment of the invention is employed, the installation being one more completely illustrated and fully described in my copending application for Laundry assorting mechanism, Serial No. 641,109, filed of even date herewith, the shafts in Fig. 1 being angularly related but in a common plane; Fig. 2 illustrates the use of the joint in an assembly wherein the shafts are centered on parallel lines; Fig. 3 is an enlarged sectional detail of the joint and associated shaft ends where the shafts are disposed as in Fig. 1; Fig. 4 is a similar view where the shafts are disposed as in Fig. 2; and Fig. 5 is a detail as in the plane of line 5—5, Fig. 3.

With reference now to the drawing, the principal parts of the invention are a body part 1 and a pair of pins 2 mounted therein.

The body part is generally cylindrical with a central through longitudinal opening provided as by the bore 3 by which the body part has end openings to receive the ends of the shafts to be universally joined. The body part has transverse openings on a pair of rectangularly related centers intercepting that of the longitudinal opening 3 and spaced therealong, in and by which transverse openings the pair of pins 2 are mounted in spaced relation along the body part, to move about and along rectangularly related diametrical axes, both the pins and the openings in which they are mounted being cylindrical as indicated in the drawing. Bosses may be provided upon the body part as indicated, to increase the bearing of the pins therein.

As appears from the drawing the opening 3 in the body member 1 is of greater diameter than that of the shafts 4 to be joined, so that the ends of the latter will be loosely received in the end openings of the body member. Also, the diameters of the pins 2 are somewhat less than that of the opening 3 and, indeed, preferably less also than that of the shafts.

The central part of each pin, which extends across the opening 3 of the body member, is cut away as illustrated to form a flat section 6 having parallel faces the extent of which, along the pin, is substantially greater than the shaft diameter, and the width of which, across the pin, is substantially the same as the pin diameter. The shaft ends are recessed or slotted as indicated at 7 to provide a forked effect, to fit over the central pin sections 6.

Thus the arrangement of each shaft end with its pin is such that there is torque-transmitting engagement therebetween, generally along the axis of the body member 1; the shaft is permitted movement with the pin along the axis of the latter, the end opening in the body member being sufficient to clear the shaft for this purpose; the shaft may have angular motion in the plane of the pin as indicated at the right Fig. 3; and, while the pin may have endwise motion along its bearings in the body member, it is retained in these bearings by the shaft end. It will be obvious that assembly of the joint with either shaft is made merely by inserting the shaft into the end opening of the body part, and engaging the forked shaft end over the thin pin section within the end opening.

In Fig. 1 three such joints 1 are indicated connecting four shafts 4 for drive therethrough, the intermediate pair of shafts 4 carrying sprockets 8. The illustration is simplified by the omission of bearings carrying the shafts 4, but it will be appreciated that the arrangement of the shafts is one wherein they lie in a common plane though angularly related. The illustration of Fig. 2 is one wherein the shafts 4 connected by the joint 1, are on parallel centers. Similarly, the joint may serve to connect a pair of shafts not lying in a common plane.

The opening 3 in the body member 1 is preferably a through opening as illustrated, and if so a lubricant-carrying member in the form of a thick disk 9 of felt or the like may be positioned in the bore between the pins 2. The disk is preferably of thickness to just fit between the pins so that it will be slightly compressed by the shaft ends when the parts are functioning, and lubricant will thus be squeezed from the disk, picked up by the parts, and quickly transmitted to the working surfaces.

The construction described is extremely simple, because the complete universal joint embodies essentially only three members, to wit, the body and the two cross pins 2. Because of its compactness it is especially useful where space is limited, and particularly where space is limited lengthwise of the driving and driven shafts. The construction lends itself readily to quantity production by very simple machine operations. Furthermore, with the construction described, power is transmitted with minimum losses by friction and otherwise and the torque is always transmitted through surface contacts of relatively large area and is substantially of uniform area at all torque transmitting zones throughout the entire device.

What I claim is:

1. A universal joint of the class described, comprising a generally cylindrical body part having end openings to receive the ends of the shafts to be universally joined, and a pair of pins mounted in unvarying spaced relation along said body part to move about rectangularly related diametrical axes, said pins being adapted to have torque-transmitting engagement each with one of said shafts inserted in the corresponding end opening, said openings being large enough to permit each shaft to swing about the axis of its pin.

2. A universal joint of the class described, comprising a generally cylindrical body part having a central through longitudinal opening and transverse openings on a pair of rectangularly related centers intercepting that of said longitudinal opening and spaced therealong, said transverse openings being spaced from the ends of said longitudinal opening and pins rotatably mounted in said transverse openings and extending across said longitudinal opening and adapted to have torque-transmitting engagement within said opening by the ends of the shafts to be universally joined.

3. A universal joint of the class described, comprising a generally cylindrical body part having a central through longitudinal opening of diameter substantially greater than that of the cylindrical ends of the shafts to be universally joined, a pair of pins mounted in unvarying spaced relation along said body part to move about rectangularly related diametrical axes, said pins being adapted to have torque-transmitting engagement each with one of the cylindrical ends of said shafts within said longitudinal opening.

4. A universal joint of the class described, comprising a generally cylindrical body part having a central through longitudinal opening, and transverse openings on a pair of rectangularly related centers intercepting that of said longitudinal opening and spaced therealong, pins rotatably mounted in said transverse openings and extending across said longitudinal opening and adapted to have torque-transmitting engagement within said longitudinal opening by the ends of the pair of shafts to be universally joined, and a lubricant-carrying member within said longitudinal opening between said pins and thereby secured.

5. A universal joint of the class described, comprising a generally cylindrical body part having end openings of size to loosely receive the ends of the shafts to be universally joined, and a pair of pins mounted in spaced relation along said body part to move about and along rectangularly related diametrical axes, each pin having a central part at one of said end openings and being there deformed for torque-transmitting engagement with a shaft end inserted in said opening, the deformation being such that the mounting of the pin will be maintained by its engagement with the shaft.

6. A universal joint of the class described, comprising a generally cylindrical body part having end openings of size to loosely receive the ends of the shafts to be universally joined, and a pair of pins mounted in spaced relation along said body part to move about and along rectangularly related diametrical axes, each pin having a central part at one of said end openings and being there deformed for torque-transmitting engagement with a shaft end inserted in said opening, the deformation being such that the mounting of the pin will be maintained by its engagement with the shaft, and the shaft will be permitted motion on the pin in the plane of the latter.

7. A universal joint of the class described, comprising a generally cylindrical body part having end openings of size to loosely receive the ends of the shafts to be universally joined, and a pair of pins mounted in spaced relation along said body part to move about and along rectangularly related diametrical axes, each pin having a central part at one of said end openings and being there cut away for torque-transmitting engagement with a forked shaft end inserted in said opening, the arrangement being such that the mounting of the pin will be maintained by its engagement of the shaft and the shaft will be permitted motion on the pin in the plane of the latter.

ANGUS F. HANNEY.